(12) United States Patent
Guzella et al.

(10) Patent No.: US 6,212,467 B1
(45) Date of Patent: Apr. 3, 2001

(54) ELECTRONIC ENGINE CONTROL SYSTEM

(75) Inventors: Lino Guzella, Wallisellen (CH); Charles Robert Koch, Pattonville/Remseck; Matthias Scherer, Esslingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/304,822

(22) Filed: May 5, 1999

(30) Foreign Application Priority Data

May 5, 1998 (DE) ................................................ 198 19 937

(51) Int. Cl.$^7$ ............................ F02M 25/07; G06F 19/00
(52) U.S. Cl. ...................... 701/103; 701/108; 123/568.21
(58) Field of Search ................................... 701/101, 102, 701/103, 108; 123/568.11, 568.21; 60/605.2

(56) References Cited

U.S. PATENT DOCUMENTS

| | | | | |
|---|---|---|---|---|
| 5,270,935 | * | 12/1993 | Dudek et al. ........................ | 701/103 |
| 5,359,519 | * | 10/1994 | Jehanno ............................... | 701/108 |
| 5,423,208 | * | 6/1995 | Dudek et al. ........................ | 701/103 |
| 5,878,717 | * | 3/1999 | Zur Loye ............................. | 701/108 |
| 5,921,223 | * | 7/1999 | Fukuma ............................... | 701/108 |
| 5,934,249 | * | 8/1999 | Nanba et al. ........................ | 701/108 |

FOREIGN PATENT DOCUMENTS

| | | | |
|---|---|---|---|
| 42 14 648 | 11/1993 | (DE) . | |
| 774574 | * 5/1997 | (EP) ................................. | 60/605.2 |
| 5-118232 | 5/1993 | (JP) . | |
| 5-118246 | 5/1993 | (JP) . | |
| 6-26383 | 2/1994 | (JP) . | |
| 7-279709 | 10/1995 | (JP) . | |
| 8-502113 | 3/1996 | (JP) . | |
| 8-121261 | 5/1996 | (JP) . | |
| 11-236857 | 8/1999 | (JP) . | |
| WO 95/04215 | 2/1995 | (WO) . | |

* cited by examiner

*Primary Examiner*—Willis R. Wolfe
(74) *Attorney, Agent, or Firm*—Evenson, McKeown, Edwards & Lenahan, P.L.L.C.

(57) ABSTRACT

An electronic engine control system for an internal-combustion engine has a computer with programs stored therein and interacts with a sensor system to determine a residual gas fraction in a combustion space of the engine. The engine control system generates a signal value, which correlates with the current residual gas fraction, from a signal value which is generated by the engine control system and which correlates with a current air/fuel mass ratio of a carbureted fuel fed to the combustion space, and from a signal value which is sensed by the sensor system and which correlates with a current air/fuel mass ratio of an exhaust gas discharged from the combustion space after the combustion.

18 Claims, 1 Drawing Sheet

ELECTRONIC ENGINE CONTROL SYSTEM

BACKGROUND AND SUMMARY OF THE INVENTION

This application claims the priority of German patent document 198 19 937.6, filed May 5, 1998, the disclosure of which is expressly incorporated by reference herein.

The invention relates to an electronic engine control system for an internal-combustion engine.

An engine control system of this type is used in modern internal-combustion engines for automatically controlling the operating performance of the internal-combustion engine. For example, such an engine control system interacts with a fuel injection system, a throttle valve in the air intake region of the internal-combustion engine, an exhaust gas recirculation system and an exhaust gas cleaning system. In addition, with a correspondingly constructed engine control system, the air/fuel mass ratio of the mixture fed to the combustion can be varied; in particular, a change-over can be permitted between rich and lean operations of the internal-combustion engine.

Modern internal-combustion engines (such as direct-injection gasoline engines, direct-injection diesel engines, common-rail injection diesel engines) may be equipped with an exhaust gas recirculation system in order to reduce the emission of pollutants and reduce the fuel consumption. In such systems, a portion of the engine exhaust gases is returned to the combustion mixture. Such an external exhaust gas recirculation changes the air-fuel mass ratio of the mixture charged into the combustion space and therefore has considerable influence on the combustion taking place there. As a result, the composition of the exhaust gases is changed, and the power and the smooth operation of the engine are influenced. In addition to being influenced by such an external exhaust gas recirculation, the operating performance of the engine can also be affected by internal exhaust recirculation. Such internal exhaust gas recirculation is performed, for example, by providing a dead volume which cannot be driven out of the combustion space by a piston of a cylinder. In addition, during charging of the mixture into the combustion space, an overlap between the closing movement of the exhaust valves and the opening movement of the intake valves leads to a return flow of exhaust gases already displaced from the combustion space into the exhaust gas system.

In order to obtain optimal values for engine performance, particularly for fuel consumption, pollutant emission and engine efficiency, the fraction of exhaust gases which exists in the combustion space before the next combustion operation must be known. only then, can the mixture composition in the combustion space be determined with sufficient precision and, as a result, by means of a suitable automatic control or control, the operating performance of the engine can be influenced.

The fraction of exhaust gas which remains in the combustion space before the next combustion (called a residual gas fraction) is taken into account with respect to characteristic diagrams in the case of conventional engine control systems. For this purpose, characteristic diagrams stored in a memory of the engine control system represent experimental values for adjustment of the exhaust gas recirculation system or of a mixing valve which influences the exhaust gas quantity externally fed to the combustion, as a function of different load condition of the internal-combustion engine. Because both internal and external exhaust gas recirculation can change during constant engine operation in order, for example, to be able to ensure a smooth engine running performance, considerable safety factors must be taken into account. As a result, the influence of the residual gas fraction by means of characteristic diagrams can be considered only in a relatively rough manner.

Other methods, which measure the residual gas fraction in the combustion space relatively precisely, have high equipment-related expenditures, and can therefore be used only in experiments within the scope of the engine development.

One object of the present invention, therefore, is to provide a system which can determine the residual gas fraction in the combustion space, at low expenditures.

These and other objects and advantages are achieved by the present invention, in which the residual gas fraction is determined exclusively from a conventionally measurable air/fuel mass ratio in the exhaust gases and from an air/fuel mass ratio adjusted by the engine control system in the carbureted fuel. Thus, for the system according to the invention, a normally existing engine control system can be used. By means of such an engine control system, an already existing signal value for the air/fuel mass ratio in the carbureted fuel is detected and is combined with a signal value for the air/fuel mass ratio in the exhaust gas sensed by a sensor system. Such a sensor system also already exists in internal-combustion engines with a modern exhaust gas cleaning system. The engine control system according to the invention can therefore easily be integrated into an existing engine control system.

In a preferred embodiment of the invention, the engine control system can influence the engine operation as a function of the signal value correlating with the residual gas fraction, when the engine control unit detects the existence of steady-state or quasi-steady-state engine operation and/or engine operation with an extrastoichiomeetric air/fuel mass ratio in the carbureted fuel. These measures are based in particular on the recognition that, in extrastoichiometric engine operation, either the fuel mass in the exhaust gas after combustion is essentially equal to zero (overstoichiometric air/fuel mass mixture in the carbureted fuel during lean operation) or the air or oxygen mass in the exhaust gas after the combustion is equal to zero (understoichiometric air/fuel mass ratio in the carbureted air in the rich operation). In addition, the invention takes into consideration that, in the case of an extrastoichiometric operation of the engine, because of the internal and external exhaust gas recirculation, HC (in the case of a rich understoichiometric operation) or $O_2$ (in the case of a lean overstoichiometric operation) builds up in the combustion space. That is, the mixture available in the combustion space for the combustion on its own becomes increasingly richer or leaner within certain limits.

Under these conditions, the following therefore applies to the fuel:

$$m_{kz}(k) = m_{kf}(k) + r_R m_{ka}(k-1)$$

wherein:

$$m_{ka}(k-1) =$$

$$\begin{cases} m_{kz}(k-1) - \frac{m_{lz}(k-1)}{\Delta}, & \text{for } m_{kz}(k-1) \geq \frac{m_{lz}(k-1)}{\Delta} \text{ (rich operation)} \\ 0, & \text{for } m_{kz}(k-1) \leq \frac{m_{lz}(k-1)}{\Delta} \text{ (lean operation)} \end{cases}$$

Analogously, the following applies to the air:

$$m_{lz}(k) = m_{lf}(k) + r_R m_{la}(k-1)$$

wherein:

$$m_{la}(k-1) = \begin{cases} m_{lz}(k-1) - m_{kz}(k-1) \cdot \Delta, & \text{for } m_{lk}(k-1) \geq m_{kz}(k-1) \cdot \Delta \text{ (lean operation)} \\ 0, & \text{for } m_{lk}(k-1) \leq m_{kz}(k-1) \cdot \Delta \text{ (rich operation)} \end{cases}$$

The following legend applies to all formulas and equations contained in the description:

$m_{lz}$=air mass in the cylinder combustion space
$m_{lf}$=air mass in the carbureted fuel
$m_{la}$=air mass in the exhaust gas
$m_{kz}$=fuel mass in the cylinder combustion space
$m_{kf}$=fuel mass in the carbureted fuel
$m_{ka}$=fuel mass in the exhaust gas
$r_R$=residual gas fraction
$\Delta$=stoichiometric air/fuel mass ratio
$\phi_z$=air/fuel mass ratio in the mixture contained in the cylinder combustion space or in the exhaust gas
$\phi_f$=air/fuel mass ratio in the carbureted fuel
k=discrete point in time in the combustion space shortly before a combustion
k−1=point in time k of the preceding combustion cycle Since the indicated equation system is not linear in the range of stoichiometric engine operation, an analysis of the residual gas fraction is expedient only in the case of an extrastoichiometric air/fuel mass ratio in the carbureted fuel.

According to another feature of a preferred embodiment of the engine control system according to the invention, in the case of rich operation of the internal-combustion engine, the signal value correlating with the residual gas fraction may represent a value calculated analogously to the equation:

$$r_R = \frac{f_z - f_f}{f_z - \frac{1}{\Delta}}$$

This measure is based on the recognition that the following applies to a rich operation with constant operating conditions, particularly with a constant engine load:

$$m_{kz}(k) = m_{kf}(k) - r_R \cdot \frac{m_{lz}(k-1)}{\Delta} + r_R \cdot m_{kz}(k-1)$$

By dividing the above-mentioned equation by the air mass in the carbureted fuel ($m_{lf}$), the following is obtained for the quasi-steady-state case:

$$\phi_z(k) = \phi_f(k) - \frac{r_R}{\Delta} + r_R \cdot \phi_z(k-1)$$

In this case, it was taken into account that, during rich operation (with an understoichiometric air/fuel mass ratio in the carbureted fuel after the combustion), no air or no oxygen is present in the exhaust gas, so that the following applies:

$$m_{la}(k) = m_{la}(k-1) = 0$$

as well as:

$$m_{lf}(k) = m_{lf}(k-1) = m_{lz}(k) = m_{lz}(k-1) = \text{const.}$$

A Z-transformation results in the following:

$$\Phi_z(Z) = \frac{\Phi_f(z) - \frac{r_R}{\Delta}}{1 = r_R Z^{-1}}$$

as well as:

$$\frac{\Phi_z(z)}{\Phi_f(Z) - \frac{r_R}{\Delta}} = \frac{z}{1 - r_R z}$$

The limit value principle will then result in:

$$\lim_{z \to 1+0} \left( (z-1) \cdot \frac{z}{1 - r_R z} \cdot \frac{z}{z-1} \right) = \frac{1}{1 - r_R}$$

Therefore, the following is obtained for the air/fuel mass ratio in the cylinder combustion space:

$$\Phi_z = \frac{\Phi_r - \frac{r_R}{\Delta}}{1 - r_R}$$

In this regard, it should be noted that the air/fuel mass ratio in the cylinder combustion space ($\phi_z$) does not change as a result of combustion. Thus, the air/fuel mass ratio existing in the exhaust gases is equal to the air/fuel mass ratio in the combustion space before the combustion; and in the equations, $\phi_z$ is the air/fuel mass ratio in both the combustion space and the exhaust gas.

The above-mentioned equation results in a conversion according to the residual gas fraction:

$$r_R = \frac{\Phi_z - \Phi_f}{\Phi_z - \frac{1}{\Delta}}$$

Corresponding to another embodiment of the engine control system according to the invention, during lean operation of the internal-combustion engine, the signal value correlating with the residual gas fraction may represent a value calculated analogously to the equation:

$$r_R = \frac{1 - \frac{\Phi_z}{\Phi_f}}{1 - \Phi_z \cdot \Delta}$$

For lean operation (with an overstoichiometric air/fuel mass ratio in the carbureted fuel), considerations apply which are analogous to the approach shown for the rich operation:

$$m_{lz}(k) - r_R \cdot m_{kz}(k-1) \cdot \Delta = r_R \cdot m_{kz}(k-1)$$

Dividing this equation by the fuel mass in the carbureted fuel ($m_{kf}$) results in the following:

$$\frac{1}{\Phi_z(k)} = \frac{1}{\Phi_f(k)} - r_R \cdot \Delta + r_R \cdot \frac{1}{\Phi_z(k-1)}$$

in which case the following applies for lean operation:

$$m_{ka}(k) = m_{ka}(k-1) = 0$$

as well as:

$$m_{kf}(k) = m_{kf}(k-1) = m_{kz}(k) = m_{kz}(k-1) = \text{const.}$$

For this case, a Z-transformation results in:

$$\Phi_z(z) = \frac{1 - r_R \cdot z}{\frac{1}{\Phi_f(z)} - r_R \cdot \Delta}$$

as well as:

$$\Phi_f(z)\left(\frac{1}{\Phi_f(z)} - r_R \cdot \Delta\right) = 1 - r_R z$$

Then the limit value principle results in:

$$\lim_{z \to 1+0} \left((z-1) \cdot 1 - r_R z \cdot \frac{z}{z-1}\right) = 1 - r_R$$

The air/fuel mass ratio in the cylinder combustion space is independent of the combustion, and therefore equal to the air/fuel mass ratio in the exhaust gas. The following therefore applies:

$$\Phi_z = \frac{1 - r_R \cdot z}{\frac{1}{\Phi_f} - r_R \cdot \Delta}$$

The above-mentioned equation will then result in a conversion according to the residual gas fraction:

$$r_R = \frac{1 - \frac{\Phi_z}{\Phi_f}}{1 - \Phi_z \cdot \Delta}$$

In a particularly advantageous embodiment of the engine control system according to the invention, the sensor system may have a λ-probe arranged behind the combustion space or behind the engine in an exhaust gas system. By means of such a λ-probe, the air/fuel mass ratio of the exhaust gases can be determined. Such a λ-probe may already exist in the case of internal-combustion engines with a modern exhaust gas cleaning system.

In an advantageous further development of the engine control system according to the invention, the sensor system for each combustion space of the engine (that is, for each cylinder), may have a sensor, particularly a lambda probe, for the air/fuel mass ratio of the exhaust gases flowing out of the combustion space. In conventional engines, the exhaust gas recirculation pipe at a point leads into a collector feed for all cylinders of the engine. Thus, as a result of the existing flow conditions (for example, pulsations, flow deflections), the returned exhaust gases may not be uniformly mixed with the taken-in fresh air, so that a different air/fuel mass ratio exists in each combustion space, which can adversely affect the smooth running of the engine. By means of the invention, however, it is possible to determine the air/fuel mass ratio of the exhaust gases emerging individually from each combustion space for the current operating condition of the engine. Based on this knowledge of the air/fuel mass ratios in each of the combustion chambers, exhaust gas recirculation can then be controlled by the engine control system so that the same air/fuel mass ratio exists in every combustion space.

In an advantageous embodiment of this further development of the engine control system according to the invention, the quantity of recirculated exhaust gas can be varied by triggering an adjusting valve in an exhaust gas recirculation system as a function of the combustion space to be currently filled. For example, in the case of a 4-cylinder engine having four combustion chambers I, II, III and IV, the engine control system may determine that, in a certain operating condition of the engine, the current air/fuel mass ratio in combustion space I is lower than; in combustion spaces II and III is equal to; and in combustion space IV is higher than the air/fuel mass ratio provided by the engine control system for this operating condition of the engine. In this case, the adjusting valve of the exhaust gas recirculation system is controlled by the engine control system such that the fresh air—fuel—exhaust gas mixture fed to combustion spaces I to IV is varied as a function of the respective combustion space I to IV to be filled therewith. In this way, uniform distribution of the exhaust gas recirculation rate or of the air/fuel mass ratio can be achieved in all combustion spaces by means of a single adjusting valve.

Other objects, advantages and novel features of the present invention will become apparent from the following detailed description of the invention when considered in conjunction with the accompanying drawings.

DETAILED DESCRIPTION OF THE DRAWINGS

Figure 1:
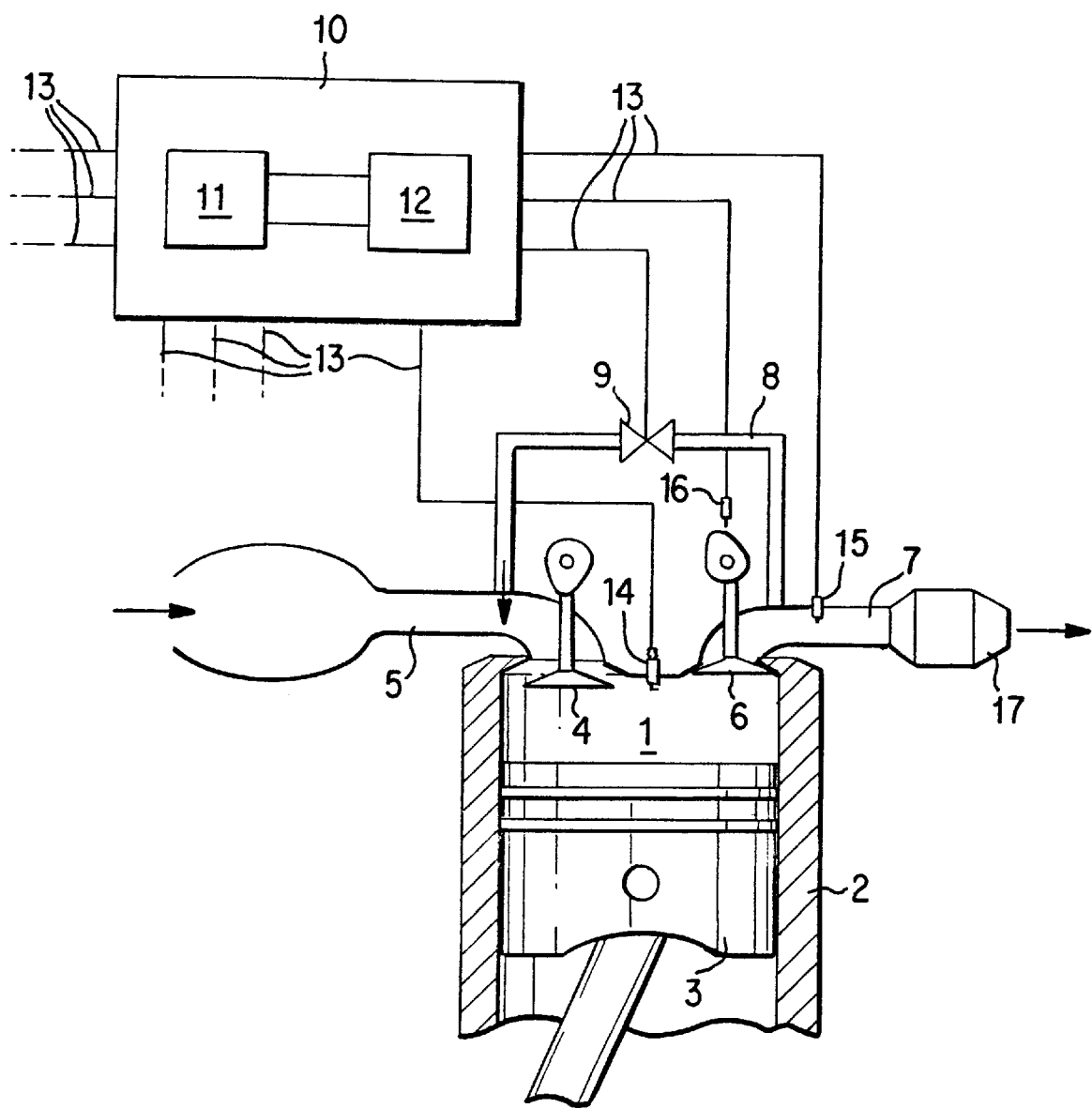
FIG. 1 illustrates an engine control system according to the invention as well as a cutout of an internal-combustion engine in the area of a cylinder combustion space.

In FIG. 1, an internal-combustion engine (otherwise not shown) has at least one combustion space 1 which, in the present example, is formed by a cylinder 2 having a piston 3 which can be moved in it. By way of an intake valve 4, a mixture from a feeding device 5 is fed to the combustion space 1 in a controlled manner. After a combustion, the exhaust gas contained in the combustion space 1 is discharged by way of an outlet valve 6 through a discharge 7 or is fed to an exhaust gas system 17 which is not shown in detail.

In addition, the engine has an exhaust gas recirculation system 8 which removes exhaust gas from the discharge 7 and leads it by way of an exhaust gas recirculation valve 9 in a controlled manner to the feeding device 5.

Because of a dead volume in the upper reversing point of the piston 3, a residual gas fraction $r_R$ of exhaust gases remains in the combustion space 1 after each combustion cycle. In addition, because of mutually overlapping opening positions of the valves 4 and 6, a return flow of exhaust gases occurs from the discharge 7 into the combustion space 1. Via the exhaust gas recirculation device 8, an external exhaust gas recirculation, which can be controlled by way of the valve 9, is added to this internal exhaust gas recirculation which influences the mixture of the gas contained in the combustion space 1.

The engine also has an engine control system 10 which has a computer 11 and a memory 12 which exchanges data therewith. By way of corresponding signal, connection and control lines 13, the engine control system 10 is connected particularly with the exhaust gas recirculation valve 9 and with a spark plug 14 of the combustion space 1. In addition, by way of corresponding lines 13, the engine control system 10 is connected with a sensor system which has a λ-probe 15 arranged in the exhaust gas system 17 and, for example, a sensor 16 sensing the cam position for the valve gear. In addition, the sensor system comprises, for example, a sensor for determining the taken-in fresh-air mass.

If, for example, during lean operation of the internal-combustion engine, the engine control system 10 determines that a steady-state or quasi-steady-state load or operating condition exists (a time period of a few seconds can already form a steady-state load condition), during this constant operating phase of the engine, the engine control system 10 causes a determination of the residual gas fraction $r_R$ corresponding to the above-described approach. For this purpose, the λ-probe 15 measures preferably continuously the oxygen fraction of the exhaust gases or generates for the engine control system 10 a signal value Sa correlating with the air/fuel mass ratio of the exhaust gases $\phi_z$. By way of the corresponding line 13, this signal value $S_a$ is fed to the engine control system 10.

By means of this signal value $S_a$ and by means of a signal value $S_f$, which is known to the engine control system 10 in all events, and which correlates with the air/fuel mass ratio in the carbureted fuel $\phi_f$, the engine control unit 10 or its computer 11 generates by means of suitable programs a signal value $S_{RGA}$ correlating with the residual gas fraction $r_R$.

By means of this signal value $S_{RGA}$, the engine control system 10 can then influence the operating condition of the engine in multiple manners. For example, the engine operating performance can be controlled to optimize pollutant emission, fuel consumption, and/or smooth operation of the engine, the engine power, and/or engine efficiency. Likewise, it is possible to change the ignition timing of the spark plug 14 or the air/fuel mass ratio in the carbureted fuel $\phi_f$ in that, for example, a fuel injection system and/or a throttle valve (not shown), for regulating the fresh-air supply for the feeding device 5, are influenced.

In addition, by means of the residual gas fraction $r_R$, the engine control system 10 can monitor the proper functioning of the exhaust gas recirculation system 8 and of the exhaust gas recirculation valve 9. For example, the engine control system 10 carries out a plausibility test as to whether the adjusted valve position is possible in the case of the measured residual gas fractions $r_R$.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An electronic engine control system for an internal-combustion engine which has a computer and a memory with programs filed therein which interact with a sensor system, based on a signal value which is generated by the engine control system and which represents an actual current air/fuel mass ratio of a carbureted fuel fed to a combustion space of the engine, and on a signal value sensed by the sensor system which correlates with a current air/fuel mass ratio of an exhaust gas discharged from the combustion space of the engine after a combustion, the engine control system generates a signal value which represents a current exhaust gas mass fraction which together with the carbureted fuel fed to the combustion space, forms a content of the combustion space after a feeding of carbureted fuel and prior to a combustion.

2. An electronic engine control system according to claim 1 wherein said exhaust gas mass fraction is a residual gas fraction.

3. The engine control system according to claim 1, wherein: as a function of the signal value which represents a current residual gas fraction, the engine control system adjusts engine operation when the engine control system determines existence of engine operation with an extrastoichiometric air/fuel mass ratio in the carbureted fuel.

4. Engine control system according to claim 1, wherein the sensor system includes a λ-probe arranged behind one of the combustion space and the engine, in an exhaust gas system.

5. Engine control system according to claim 1, wherein, to influence engine operation, the engine control system varies at least one of an air/fuel mass ratio of carbureted fuel, an exhaust gas quantity fed to a combustion space by an exhaust gas recirculation system of the engine and an ignition point for combustion, as a function of the signal value which represents a current residual gas fraction.

6. Engine control system according to claim 1, wherein the engine control system monitors proper functioning of an exhaust gas recirculation system of the internal-combustion engine, by means of the signal value which represents a current residual gas fraction.

7. Engine control system according to claim 1, wherein:

as a function of the signal value representing a current residual gas fraction, the engine control system adjusts engine operation when the engine control system determines existence of a steady-state or quasi-steady-state engine operation.

8. The engine control system according to claim 7, wherein: a function of the signal value which represents a current residual gas fraction, the engine control system adjusts engine operation when the engine control system determines existence of engine operation with an extrastoichiometric air/fuel mass ratio in the carbureted fuel.

9. Engine control system according to claim 8, wherein during rich operation of the engine, the signal value which represents the residual gas fraction has a value calculated according to the equation:

$$r_R = \frac{\Phi_z - \Phi_f}{\Phi_z - \frac{1}{\Delta}}$$

wherein
$r_R$=residual gas fraction
$\phi_z$=air/fuel mass ratio in the exhaust gas
$\phi_f$=air/fuel mass ratio in the carbureted fuel
$\Delta$=stoichiometric air/fuel mass ratio.

10. Engine control system according to claim 8, wherein during lean operation of the engine, the signal value which represents a residual gas fraction has a value calculated according to the equation:

$$r_R = \frac{1 - \frac{\Phi_z}{\Phi_f}}{1 - \Phi_z \cdot \Delta}$$

wherein
$r_R$=residual gas fraction
$\phi_z$=air/fuel mass ratio in the exhaust gas
$\phi_f$=air/fuel mass ratio in the carbureted fuel
$\Delta$=stoichiometric air/fuel mass ratio.

11. Engine control system according to claim 1, wherein the sensor system has a separate sensor for measuring air/fuel mass ratio separately for each combustion space of the engine.

12. Engine control system according to claim 11, wherein a recirculated exhaust gas quantity is varied by triggering an adjusting valve in an exhaust gas recirculation system as a function of combustion space currently to be filled.

13. A method of controlling operation of an internal combustion engine having a computer, and a memory and a sensor system associated with the computer, said method comprising:

said computer determining existence of a substantially steady state operation of said engine, based on signals from said sensor arrangement; and during existence of a substantially steady state operation of said engine, based on a signal generated by said computer which represents an actual current air/fuel ratio of a mixture input to a combustion chamber of said engine, and on a signal received from the sensor system representing a current air/fuel ratio of an exhaust gas discharged from said combustion chamber, said computer generating a signal which represents a current exhaust gas mass fraction; and recirculating and mixing a portion of said exhaust gas with said mixture input to said combustion chamber, as a function of said signal which represents a current exhaust gas mass fraction.

14. An electronic engine control system according to claim 13 wherein said exhaust gas mass fraction is a residual gas fraction.

15. An electronic engine control system for an internal combustion engine having a computer, a plurality of sensors for measuring operating parameters of the engine, and a memory encoded with a program which includes steps for:

said computer determining existence of a substantially steady state operation of said engine, based on signals from said sensor arrangement; and during existence of a substantially steady state operation of said engine, based on a signal generated by said computer which represents an actual current air/fuel ratio of a mixture input to a combustion chamber of said engine, and on a signal received from the sensor system representing a current air/fuel ratio of an exhaust gas discharged from said combustion chamber, said computer generating a signal which represents a current exhaust gas mass fraction; and said computer causing a recirculating and mixing a portion of said exhaust gas with said mixture input to said combustion chamber, as a function of said signal which represents a current exhaust gas mass fraction.

16. An electronic engine control system according to claim 15 wherein said exhaust gas mass fraction is a residual gas fraction.

17. A method for controlling operation of an internal combustion engine having a computer, and a memory and a sensor system associated with the computer, said method comprising:

said computer determining a first signal value which represents an actual current air/fuel ratio of a fuel mixture fed to a combustion space of said engine, based on signals from sensors in said sensor system;

said computer receiving a second signal value sensed by said sensor system, which second signal is indicative of a current air/fuel mass ratio of an exhaust gas discharged from the combustion space of the engine after a combustion;

based on said first and second signal values, said computer generating a signal indicative of a current exhaust gas mass fraction which, together with said fuel mixture fed to said combustion space, forms a content of the combustion space prior to a combustion; and recirculating and mixing a portion of said exhaust gas with said mixture input to said combustion chamber, as a function of said signal which represents a current exhaust gas mass fraction.

18. The method according to claim 17 wherein said exhaust gas mass fraction is a residual gas fraction.

* * * * *